US 12,373,295 B2

United States Patent
Boschi et al.

(10) Patent No.: US 12,373,295 B2
(45) Date of Patent: Jul. 29, 2025

(54) REGISTER FAULT DETECTOR

(71) Applicant: Intel Corporation, Santa Clara, CA (US)

(72) Inventors: Gabriele Boschi, San Leonardo In Treponzio (LU) (IT); Srajudheen Makkadayil, Bangalore (IN); Rekha Manjunath, Karnataka (IN); Bakshree Mishra, Odisha (IN); Alessandro Campinoti, Pisa (IT)

(73) Assignee: INTEL CORPORATION, Santa Clara, CA (US)

( * ) Notice: Subject to any disclaimer, the term of this patent is extended or adjusted under 35 U.S.C. 154(b) by 888 days.

(21) Appl. No.: 17/353,848

(22) Filed: Jun. 22, 2021

(65) Prior Publication Data

US 2021/0311832 A1 Oct. 7, 2021

(51) Int. Cl.
*G06F 11/263* (2006.01)
*G06F 11/10* (2006.01)
*G06F 11/14* (2006.01)

(52) U.S. Cl.
CPC ............ *G06F 11/142* (2013.01); *G06F 11/10* (2013.01); *G06F 11/1068* (2013.01); *G06F 11/263* (2013.01); *G06F 2201/82* (2013.01)

(58) Field of Classification Search
CPC .... G06F 11/10; G06F 11/263; G06F 2201/82; G06F 11/142; G06F 11/1068
See application file for complete search history.

(56) References Cited

U.S. PATENT DOCUMENTS

| | | | | |
|---|---|---|---|---|
| 5,812,757 A | * | 9/1998 | Okamoto | G06F 11/1658 714/E11.069 |
| 9,032,256 B2 | * | 5/2015 | Douskey | G06F 11/273 714/45 |
| 2011/0225475 A1 | * | 9/2011 | Kumar | G11C 8/16 714/763 |
| 2013/0173970 A1 | * | 7/2013 | Kleveland | G11C 29/50 714/710 |
| 2019/0089383 A1 | * | 3/2019 | Funaoka | G06F 11/1048 |
| 2022/0091928 A1 | * | 3/2022 | Fernandes | G06F 13/4031 |
| 2022/0283897 A1 | * | 9/2022 | Yang | G06F 11/1068 |

* cited by examiner

*Primary Examiner* — Bryce P Bonzo
*Assistant Examiner* — Audrey Emma Whitesell
(74) *Attorney, Agent, or Firm* — VIERING, JENTSCHURA & PARTNER mbB

(57) ABSTRACT

A fault detector has a processor configured to receive, during a register write event, first data that are to be stored on a first register; determine a first encoded value from the first data using an encoding operation; receive second data from the first register from one or more bit locations on which the first data were to be stored; determine a second encoded value from the second data using the encoding operation; and compare the first encoded value and the second encoded value. If the first encoded value is the same as the second encoded value, the fault detector operates according to a first operational mode; and if the first encoded value is different from the second encoded value, the fault detector operates according to a second operational mode.

24 Claims, 8 Drawing Sheets

REGISTER FAULT DETECTOR

TECHNICAL FIELD

Aspects of the disclosure relate to non-destructive fault testing in registers.

BACKGROUND

Various technological applications require devices to perform safety critical tasks. As a non-limiting example, this may often be the case in automotive or industrial applications, or in other applications that may be subject to strict functional safety requirements. In this context, such functional safety may, for example, relate to the adherence of various safety standards, such as International Electrotechnical Commission Standard IEC61508 ("Functional Safety of Electrical/Electronic/Programmable Electronic Safety-Related Systems") and/or International Organization for Standardization standard ISO26262 ("Road vehicles—Functional safety"), which generally recommend using integrated diagnostics and may require the ability to test such integrated diagnostics in the field. In some circumstances, it may be desirable to use standard, commercially available, or off-the-shelf hardware (e.g., Systems on Chips (SoCs)) in these safety critical environments.

One issue arising with the implementation of SoCs in safety critical environments is the need to perform fault tests on SoC registers. On-chip registers define the software interface to the semiconductor and usually represent the largest portion of the device specification and programmer's guide. As SoCs become more complex, so too increases the number of registers found on a given SoC. The large number of registers creates difficulties in meeting the functions safety requirements for diagnostics and on-field testing of the registers. Given the number of registers, it may be desirable or even necessary to automate large scale functional safety register diagnostics, such as, for example, implementation, validation, and documentation.

BRIEF DESCRIPTION OF THE FIGURES

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DETAILED DESCRIPTION

Figure 1:
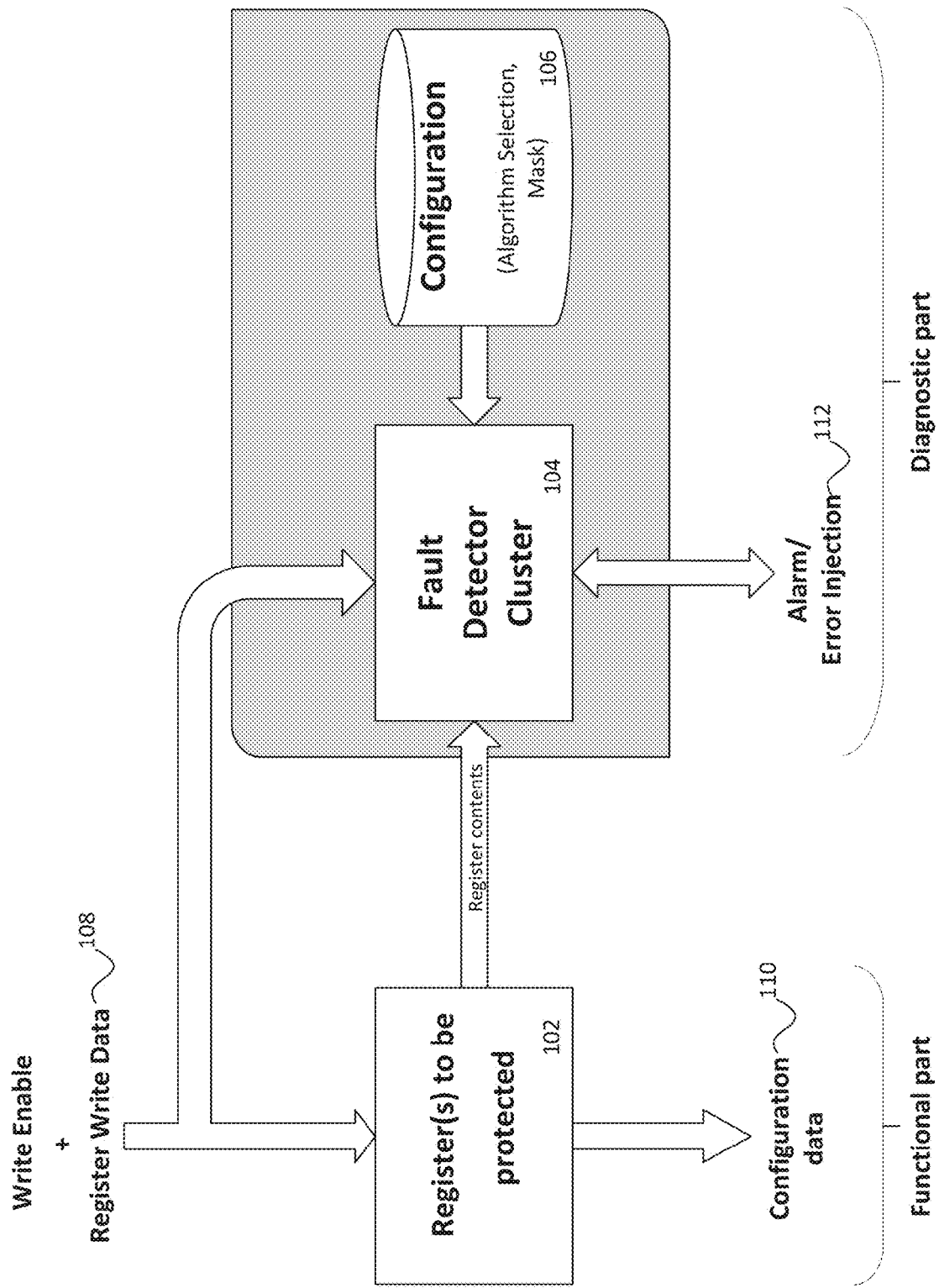
FIG. 1 depicts a high-level overview of a register fault detector.

The following detailed description refers to the accompanying drawings that show, by way of illustration, exemplary details and aspects in which aspects of the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as, for example, used herein may be understood as any kind of technological entity that allows handling of data. The data may be handled according to one or more specific functions executed by the processor or controller. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

As used herein, "memory" is understood as a computer-readable medium (e.g., a non-transitory computer-readable medium) in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Various software-based, or mixed software-and-hardware-based, efforts have been made to verify or protect registers using one or more algorithms such as a parity check, a cyclic redundancy check (CRC), or using an Error Correction Code (ECC). Some custom implementations have included protecting a 32-bit write accessible register with a 1-bit parity; protecting a 32-bit write accessible register with a 7-bit single error coding (SEC)-double error coding (DED) ECC; or protecting an 8-bit write accessible register with a 4-bit parity. These strategies have fallen short, however, as they have not provided the kind of rapid, on-field testing that is necessary to meet certain functional safety standards. Furthermore, these strategies have been cumbersome and difficult to implement. For example, existing register protection algorithms using ECC, CRC and parity require separate implementations (e.g. different specifications), which complicates efforts to switch between algorithms and to integrate them within SOC design. Furthermore, such custom solutions have been difficult to automate, to scale to new designs, and to register definition changes due to technical enhancements. Moreover, the software aspects of the above-referenced "software-based, or mixed software-and-hardware-based" solutions are slower than hardware implementations, require periodic software intervention, and are less reliable than primarily hardware-based implementations. These software aspects may be unable to meet certain rapid on field testing requirements.

Herein is described a primarily hardware-based implementation which enables register protection to ensue immediately after reset and may continuously monitor for errors every clock cycle, reducing firmware/software overhead. The register fault detector enables Functional Safety in SoCs by monitoring faults in configuration registers. A register fault detector may be instantiated for every register to be protected. A register fault detector can be configured in terms of which protection algorithm to be applied to a register, which fields to be masked and exempted from protection, whether error is to be injected into the register fault detector, or any of these. The register fault protector may include memory elements, in which it stores an encoding of the register that is being monitored, wherein the number of bits required per register depends on the selected protection algorithm.

FIG. 1 depicts a high-level overview of a register fault detector as described herein. FIG. 1 includes one or more registers to be protected 102, a fault detector 104 or fault detector cluster, and a configuration circuit 106. The fault detector 104 has a first electrically conductive connection to an input of a register to be protected 102. As will be described infra, this electrically conductive path may be a direct path between the register to be protected 102 and the fault detector 104, or may be a path to one or more multiplexers or other means of selectively routing signals from any of a plurality of registers, which may then be connected to any of the plurality of registers for signal routing. The fault detector also includes a second electrically conductive connection, from an output of the register to be protected 102 to the fault detector 104. Using the first electrically conductive connection, the fault detector 104 receives register write data 108, which is data to be written on the register to be evaluated for fault 102. That is, during a write event for the register to be evaluated for fault 102, the fault detector 104 receives data 108 (also referred to herein as first data) to be written on or stored on the register to be evaluated for fault 102. As will be described infra, the fault detector 104 is configured to perform an encoding operation to generate an encoded value (also referred to herein as the "first encoded value") from the data to be written on the register 108.

Furthermore, the fault detector 104 receives data actually stored on the register to be evaluated for fault 102 (this data may be referred to throughout as the second data). The second electrically conductive connection (e.g. the connection between the register to be protected 102 and the fault detector 104) may be such that the fault detector 104 has constant and/or immediate access to the stored data on the register to be evaluated for fault 102. In this manner, it may be unnecessary to perform a traditional readout of the register 102, as the stored data are immediately available to the fault detector without performing a tradition "read-out", per se. Alternatively, the system may be structured such that the fault detector 104 performs a readout of the register to be protected 102 to obtain the store data. The fault detector 104 is configured to perform an encoding operation on the second data. As will be described infra, this encoding operation may be any of a plurality of possible encoding operations; however, the encoding operation performed on the data to be written on the register (the first data) and the encoding operation performed on the stored data (the second data) will generally be the same encoding operation to allow for comparison of the resulting values.

That is, data to be stored 108 on a register and the data that are actually stored on the register 102 resulting from the data to be stored 108 should generally be identical. Accordingly, performance of the same encoding operation on both sets of data should yield identical encoded values. When these two values are compared, if they are identical, this is an indication that the register is operating properly (e.g. it is accurately storing its received write data). Conversely, if the two values are different, this suggests that the data actually stored on the register 102 differs from the data that were supposed to be stored 108 on the register. This may be evidence of a register fault. In addition, the fault detector may include a configuration circuit 106, which may permit the fault detector to implement any of a variety of options including algorithm selection, masking, or any of these. The fault detector may also include an error in injector and alarm 112. These will be discussed in greater detail, infra.

Figure 2:
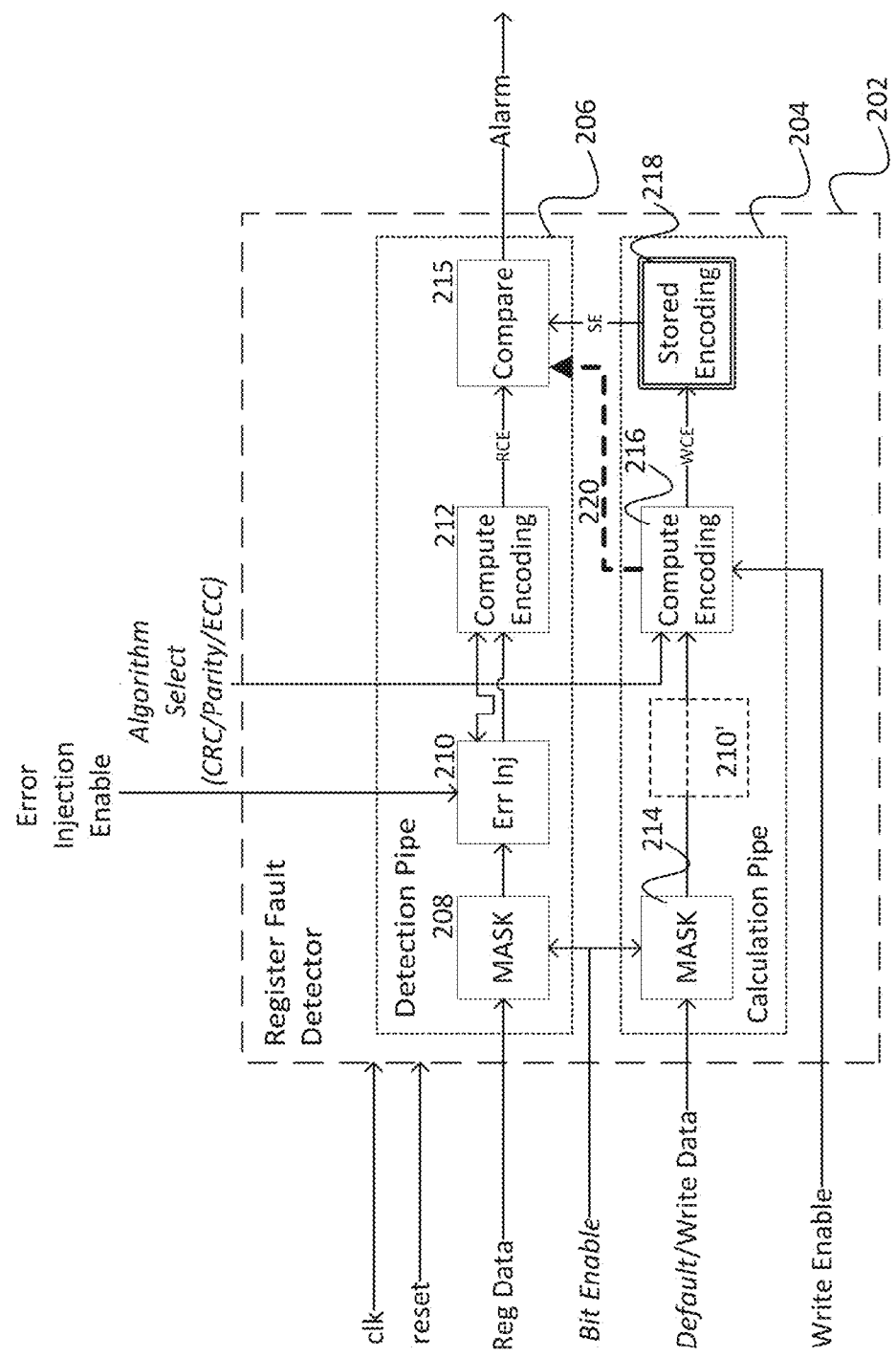
FIG. 2 depicts a schematic of the register fault detector, in which the various functions are depicted as individual circuits.

FIG. 2 depicts a schematic of the register fault detector, in which the various functions are depicted as individual circuits. The register fault detector 202 is depicted as one or more processors, which are configured to receive a clock input, a reset input, a register data input, a write data input, and a write enable input. Although these inputs are depicted herein for demonstrative purposes, the register fault detector 202 may contain fewer or more of these inputs. Similarly, the register fault detector 202 may be configured to receive one or more of these inputs as a combined input (e.g. at the same input connection, at the same input port). The register fault detector 202 may be configured as including a calculation pipe 204 and a detection pipe 206. The calculation pipe 204 may be configured to receive write data (e.g. data to be written on a register). The calculation pipe computes and stores the encoded value corresponding to the register write data. The calculation pipe may be configured to be active immediately after a reset phase and during write cycles to the register. During reset, the calculation pipe may be configured to calculate the compute encoding value based on a selected encoding operation over the default value of the register. During the write cycle, the calculation pipe may be configured to compute the second encoding value over the new written data.

The write data may be optionally masked via the masker (e.g. a masking circuit) 214. The masker may be configured to mask one or more bits of the received write data such that the fault detector uses fewer than all bits of the received write data to calculate an encoded value. Additionally or alternatively, the masker may be configured to mask one or more bits of the received write data such that the fault detector computes the encoded value from masked bits (e.g. masked register data bits, in the case of the detection pipe 206, or masked write data bits, in the case of the calculation pipe). That is, the masker may mask one or more bits with a predetermined value (e.g. masked with a predetermined value), irrespective of the value received within the write data. Alternatively or additionally, the masker may discard the unused bits, such as unused bits from the register data and/or unused bits from the write data. The fault detector sends the received write data, which the fault detector has optionally masked via the masker 214, to the compute encoding circuit 216. The masker may mask on a per-register and per-field basis, such as to take into account the availability of different register fields.

The compute encoding circuit 216 calculates an encoded value using an encoding operation. As will be described infra, the register fault detector 202 may be configured to use any of a plurality of encoding operations to calculate the encoded value. The register fault detector computes and stores an encoded value of the register contents (e.g. of the first data that were to be stored on the first register) based on the encoding operation, such as a parity, an error correction code, a cyclic redundancy code, or any of these. This may permit ease of usage, as well as desirable trade-offs in terms of area occupation versus level of protection. The register fault detector 202 may select the encoding operation based on any factor, including, but not limited to, a type of register on which the write data are to be stored, a preferred bit length of the encoded value, a preferred security level of the encoded value, available processing resources of the register fault detector 202, a Functional Safety Level, or any of these. Once the compute encoding circuit 216 has computed the encoded value for the first data using the encoding operation, the encoded value is stored on a register within the register fault detector 202, depicted herein as stored encoding 218. The encoded value remains in the stored encoding register 218. The stored encoding circuit 218 includes memory elements to store the computed encoding of register contents. The number of bits required to store a register's encoding depends on the selected algorithm (for example for a 32 bit register, 1 bit for parity, 7 bits for SEC-DED codes, etc.). These are provided for illustrative purposes and are not intended to be limiting. These memory elements are updated whenever there is an active computation. The stored values are used by the detection pipe every clock cycle for comparison. Although the second register is described herein as a being a part of the fault detector, it is expressly stated that the second register need not reside within a particular area or region otherwise defined as the fault detector, but can be incorporated elsewhere, provided that an electrically conductive connection is available between the second register and the processor of the fault detector.

The detection pipe 206 receives register data. The register data are data that are stored on the register corresponding to the received write data. That is, the register data are data from the register on which the received write data were to be stored. As will be described infra, the register fault detector 202 may be configured to receive write data and register data from any of a plurality of registers, and the register fault detector 202 may be configured to selectively connect to any of the plurality of registers, such as through a multiplexing procedure or otherwise. The detection pipe 206 may be idle during reset. After reset, the detection pipe 206 may be configured to calculate a second encoded value from the register output data using the selected encoding operation. That is, the first encoded value is calculated from the first data, which are data to be written on the register, and the second encoded value calculated from register output data (which may be referred to herein as "second data"). The detection pipe 206 may calculate the second encoded value on each clock cycle.

The masker 208 operationally receives the register data; the masker 208 may be configured to perform one or more masking operations on the register data similar to the masking operations performed by the masker 214 on the write data, if any. The maskers 208 and 214 allow for selective enabling and disabling of specific register fields while calculating the encoded value of a register. This feature may optimize the design by masking unused, read-only, non-critical register fields, or any of these.

The fault detector may send the received register data, which the masker 208 may optionally mask, to the compute encoding circuit 212 (the optional error injection 210 be addressed infra). The computing encoding circuit 212 performs an encoding operation on the received register data/the received masked register data to determine an encoded value. The compute encoding circuits 212 and 216 may be configured with a selected algorithm (e.g. an algorithm to calculate the first encoded value and/or the second encoded value), such as based on system on chip requirements. The compute encoding circuits 212 and 216 may calculate the encoded value for register data as per the selected algorithm (e.g. the encoding operation). In one aspect, default data may be stored on the register during a reset, such that the encoded value may be calculated based on the default data. In another aspect, compute encoding circuit 216 may calculate the first encoded value from the write data at a write event (e.g. at every write event); and compute encoding circuit 212 may calculate the second encoded value from the first register data every clock cycle.

As with the compute encoding circuit 216, any of a plurality of encoding operations may be used. Of importance, however, is that the encoding operation performed by the compute encoding circuit 216 and the encoding operation performed by the compute encoding circuit 212 should be the same, or at least should be such that identical data received by the compute encoding circuit 212 and the compute encoding circuit 216 will result in identical or matching encoded values. For example, assuming that the compute encoding circuit 212 and the compute encoding circuit 216 utilize the same encoding procedure (e.g. the same encoding algorithm, the same encoding function), it would be expected that identical input data (e.g. identical first data and identical second data) would result in identical encoded values. Alternatively, the encoding operations may be selected to generate matching or complementary encoded values. For example, the first encoded value may be a four-bit binary number, such as 0010, whereas the second encoded value may be an inverse four-bit binary number, such as 1101. In this example, 0010 and 1101 are not identical, yet they match. Any such matching schema may be employed as a basis to verify a match between the first encoded value and the second encoded value.

The comparator 215 compares the encoded value determined by the compute encoding circuit 212 and the stored encoded value in the stored encoding register 218. If the comparator 215 determines that the encoded value from the compute encoding circuit 212 and the encoded value from the stored encoding register 218 are identical, the comparator 215 may send a signal representing an instruction to operate according to a first operational mode. If the comparator 215 determines that the encoded value from the compute encoding circuit 212 and the encoded value from the stored encoding register 218 are not identical, the comparator 215 may send a signal representing an instruction to operate according to a second operational mode. Of note, although the term "comparator" is used with respect to the circuit 215, the term is not intended to be limited to an analog comparator (e.g. a comparator based on a differential high gain amplifier), but may be implemented as part of an alternative logic configuration, a processor, or otherwise. The compute encoding circuits 212 and 216 and the comparator 215 are combinatorial. This may be of particular relevance in the critical detection pipeline 206, where the pipe is active every clock cycle. Even though register fault detector checking is performed every clock cycle, flop power consumption is only during register writes and fault detection. This advantageously reduces dynamic power consumption.

By comparing the encoded value from the compute encoding circuit 212 and the stored encoded value from the stored encoding circuit 218, the register fault detector 202 can determine whether the write data to be stored on a register were in fact accurately stored. Furthermore, because the register fault detector 202 may repeatedly receive register data following a write event (e.g. may receive register data during each of a plurality of clock cycles following a single write event and before a next write event), the comparison of the encoded value from the compute encoding circuit 212 and the stored encoded value from the stored encoding circuit 218 also verifies whether the write data remain correctly stored on the register.

The first operational mode generally corresponds with a determination that the write data were correctly stored and/or remain correctly stored on the register (e.g. the register is functioning properly and no fault has been detected). The first and second operational modes may be configured based on a desired implementation. Two possible configurations of the first operational mode and the second operational mode will now be described.

In a first configuration of the first operational mode and the second operational mode, the first operational mode may generally be understood as a lack of sending an error message. That is, in the first configuration of the first operational mode, identical encoded value from the compute encoding circuit 212 and the stored encoding register 218 may not require the comparator 215 and/or the register fault detector 202 to send any signal representing an affirmative notification that no fault was detected. According to this first configuration of the first operational mode, the fault detector may send no signal when the encoded values are identical, and only when the encoded values are not identical will the comparator 215 and/or the register fault detector 202 send a signal representing an error or detected fault (e.g. in the second operational mode).

In a second configuration of the first operational mode and the second operational mode, the underlying system may be configured to assume an error unless an affirmative statement is received that no error is present. In this second configuration, the comparator 215 compares the encoded value of the compute encoding circuit 212 and the stored encoded value in the stored encoding register 218. If these encoded values are identical, the comparator 215 and/or the register fault detector 202 sends a signal representing a notification that no fault has been detected. In this manner, the first operational mode corresponds to the sending of a signal representing a notification that no fault has been detected. Conversely, in the second operational mode according to the second configuration, no signal representing a notification that no fault has been detected is sent. That is, when a fault is detected, no affirmative "no-fault" signal is sent, and the underlying system may assume the presence of a fault. Alternatively, it may be desirable, even in the second configuration, to have the comparator 215 and/or the register fault detector 202 message indicating the detection of a fault whenever a fault is detected. Whether the first operational mode and the second operational mode are configured according to the first configuration or the second configuration is a matter of preference for the given implementation.

Turning to the error injection circuit, the error injection circuit 210 may be optionally employed to test the register fault detector 202. The error injection circuit 210 may be optionally employed to insert an error within the detection pipe 206 such that the encoded value used by the comparator 215 is altered or otherwise different from the value that the encoded value would be, had the encoded value been calculated from (masked) register data without the addition of an injected error. The register fault detector may be configured to compute, check, store, and inject errors, such as based on a selected algorithm. The error injector may permit self-testing of a cluster of register fault detectors in parallel in one clock cycle. This error injection testing can be implemented, for example, with hardware-based Functional Safety or under software/firmware control. Error injection can be executed in the field during startup or power-off, or even on demand depending on user request.

In a first implementation, the compute encoding circuit 212 may compute the encoded value as described supra, and the error injector circuit 210 may alter the encoded value to be a value different from the value calculated by the compute encoding circuit 212. Alternatively or additionally, the error injection circuit 210 may alter one or more of the register data or the masked register data and deliver these altered data to the compute encoding circuit 212 for calculation of the encoded value. In this manner, and by changing the data used for calculation of the encoded value, the error injection circuit 210 ensures that the encoded value calculated is different from the encoded value that would have been calculated, had (masked) register data without the addition of an injected error been used.

By injecting an error, the error injection circuit 210 ensures that the encoded value calculated within the detection pipe 206 and the encoded value calculated in the compute encoding circuit 216 (subsequently stored in the stored encoding register 218) are different, and therefore that the register fault detector 202 will operate according to the second operational mode. In this manner, the error injector circuit 210 creates a scenario in which the register fault detector 202 can be tested, to ensure that the second operational mode will be entered upon the mismatch of the encoded value from the detection pipe 206 and the encoded value from the calculation pipe 204. The error injection circuit 210 may inject errors in any, or any combination, of four different injection points. First, the error injection circuit 210 may inject an error into the first data. In this configuration, it is noted that this error injection is non-destructive (e.g. it does not change the write data that are to be stored on the register); however, when the fault detector detects the first data (e.g. the write data), the error injection circuit 210 may locally alter (e.g. alter within the fault detector while leaving the data to be stored on the first register unchanged) the first data. This local alteration of the first data results in the first encoded value being different from the first encoded value that would have been calculated solely from the encoding operation as applied to the first data. Second, the error injection circuit 210 may alter the first encoded value, such that the first encoded value is modified compared to a first encoded value that would be calculated based solely on the encoding operation as applied to the first data. The connections for the first and second injection points are depicted as the bidirectional connections between the error injection circuit 210 and the compute encoding circuit 212. Third, the error injection circuit 210 may alter the second data. In this configuration, the fault detector detects the second data actually stored on the register; the error injection circuit 210 modifies these data; and the fault detector calculates the second encoded value from the modified second data. Fourth, the error injection circuit 210 may alter the second encoded value. In this configuration, the error detector determines the second encoded value by applying the encoding operation to the second data, and the error injection circuit 210 modifies this resulting second encoded value. When the third or fourth injection point is selected, the error injection circuit may be alternatively located between the masker 214 and the compute encoding circuit 216, as depicted by 210' (the dashed outline and dashed connection are intended to represent the optional placement of the error injection circuit 210' between the masker 214 and the compute encoding circuit 216. In the first and second injection points, the connection line representing the connection between the masker 214 and the compute encoding circuit 216 should be understood as a solid line). In any of these configurations—e.g. regardless of whether the error injection circuit 210 alters the first data, the first encoded value, the second data, or the second encoded value—the error injection circuit 210 may utilize any of a variety of options to alter the data. In one configuration, the error injection circuit 210 may be configured to flip one or more bits of the associated values (e.g. first data, first encoded value, second data, or second encoded value) such as flipping one or more zeros to ones, or vice versa. In another configuration, the error injection circuit 210 may be configured to insert one or more predetermined bits into the associated values (e.g. first data, first encoded value, second data, or second encoded value) such that the original bits are overwritten by the one or more predetermined bits. Finally, in the third and fourth injection points, the locally altered first encoded value will not be stored in the stored encoding circuit 218, but will rather be bypassed along connection 220 directly to the compare circuit 215, so as to ensure that the error injection is non-destructive.

Figure 3:
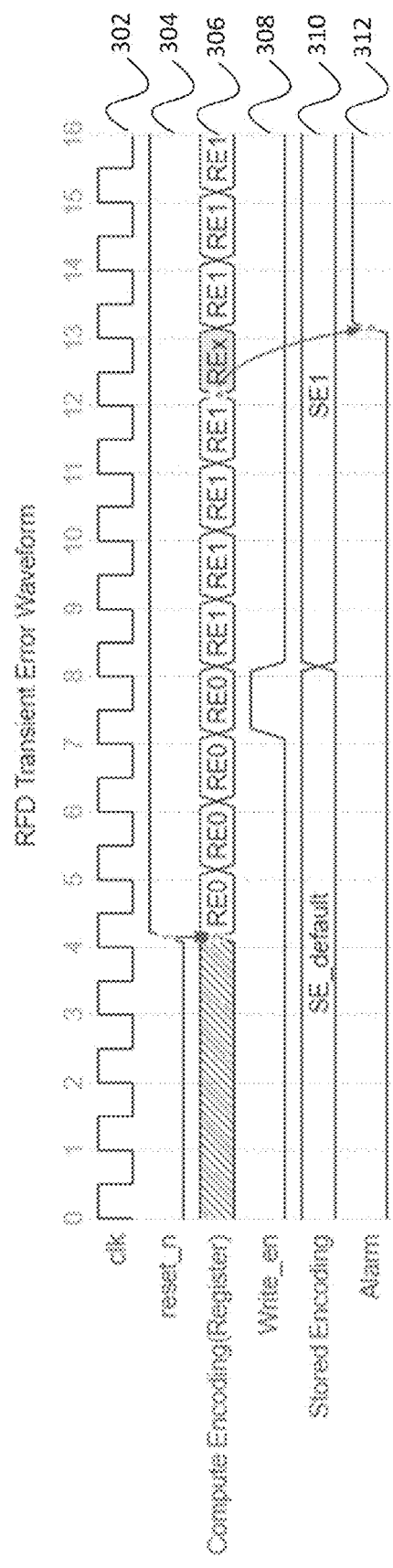
FIG. 3 depicts a time-based operation of the register fault detection.

FIG. 3 depicts a time-based operation of the register fault detection, as described herein. The register fault detector may be configured to receive a clock signal 302, such as a square wave or any other kind of clock signal appropriate for the implementation. The register fault detector may be configured to receive a reset signal 304, which may indicate to the register fault detector when a reset occurs. It may be desired, for example, to begin register fault detection immediately upon completion of a reset operation. As depicted herein, the reset signal 304 indicates completion of a reset at clock signal 4, and the register fault detection is begun upon this reset signal's indication that the reset operation is complete. Once the register fault detection operations have begun, the compute encoding 306, write enable ("write_en") 308 (e.g. a signal indicating a write event for data to be stored on the first register), and stored encoding entries are of particular importance. As shown herein, the stored encoding value 310 is the value stored on the stored encoding register 218 within the calculation pipe 204. In this particular example, the first stored encoding value within 310 is labeled as "SE_default", which in this case corresponds to a default value related to the operation of a reset procedure, as indicated by clock signals 1-4 of reset signal 304. However, the stored encoding value, as described above, may alternatively be a value calculated based on a write event, which will also be described in greater detail relative to clock signals 8-16.

Starting with clock signal 4, the register fault detector receives data stored on register 0. This data are received each clock signal, for example, are optionally masked as described relative to masker 208, and are sent to the compute encoding circuit 212 for calculation of the encoded value. This procedure may occur each clock cycle, such that the compute encoding circuit 212 calculates a new encoded value for each clock cycle. This is depicted herein online 306 with respect to the compute encoding values at clock cycles 4, 5, 6, and 7. Each of these calculated encoding values is compared to the stored encoding value depicted on line 310, which also corresponds to the stored encoding circuit 218. If these two encoded values are identical, the register fault detector will operate according to the first operational mode. If these two encoded values are different, the register fault detector will operate according to the second operational mode. The second operational mode may correspond to the sending of a signal representing and a notification of a mismatch, which may otherwise be understood as an alarm. The alarm signal is depicted on line 312. As can be seen herein, the registered value from the compute encoding line 306 and the register value from the stored encoding line 310 were identical on clock signals 4-7, and therefore the alarm signal is "low", indicating that no alarm is sent.

During a write event, data are sent to a register to be stored. A write event may be indicated by a write event signal, as is depicted in line 308 during clock cycle 7. The high value of 308 at clock cycle 7 indicates that data (e.g. encoded data) are sent to be stored on register 1. These data (e.g. these encoded data) to be stored are received by the detection pipe 206, and the compute encoding circuit 212 calculates the encoded value as described supra. This value is depicted as being stored in the stored encoding register 1 in line 310. Starting with clock cycle 8, the data stored on register 1 are received, and an encoded value is calculated by the compute encoding circuit 212, as described supra. This encoded value is compared with the stored encoded value in the stored encoding circuit 218, or otherwise as depicted in line 310, as SE1. In this case, the encoded value of the compute encoding labeled as "RE1" matches the stored encoding value labeled as "SE1", and therefore the fault detector operates according to the first operational mode, and no alarm is present (see low alarm signal at 312 from clock signals 7-12).

At clock signal 12, however, the registered encoding value (e.g. the encoded value determined by the compute encoding circuit 212 from the stored data on register one) is changed, as indicated by label "REx". This may be due, for example, to a fault in register one, or an error injection by the error injection circuit 210. Whatever the cause, the encoded value REx does not match the encoded value SE1, which causes the fault detector to enter the second operational mode at clock cycle 12. In this manner, the alarm signal, depicted at 312, goes high, indicating that an alarm is present due to the second operational mode.

Figure 4:
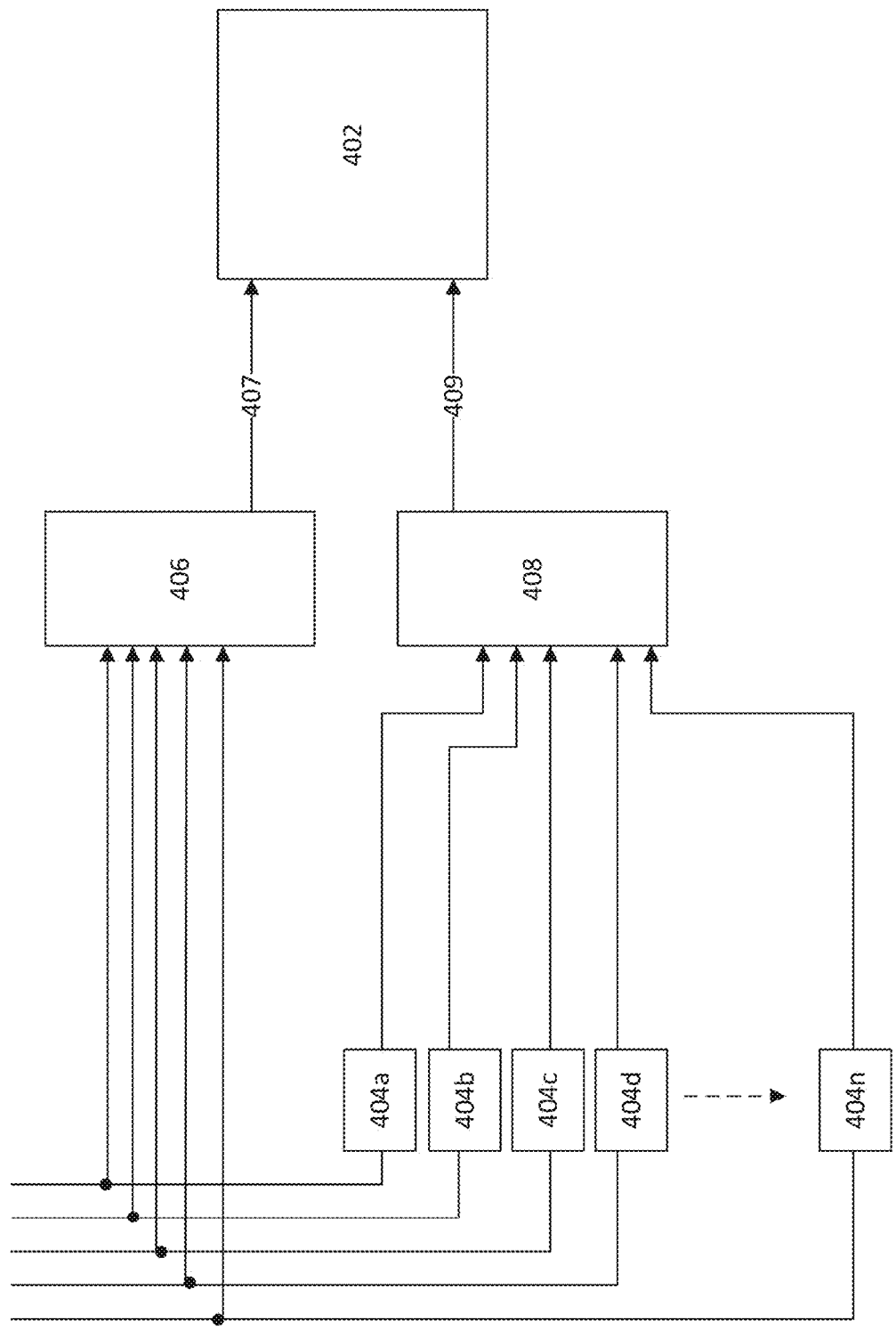
FIG. 4 depicts an optional time-multiplexing configuration for register fault detection.

FIG. 4 depicts an optional time-multiplexing configuration for register fault detection. In FIG. 4, the register fault detector 402 may be configured to perform register fault detection on a plurality of registers, depicted herein as 404a-404n. The register fault detector 402 may be connected to the conductors carrying the write data for the various registers to be tested (e.g. the calculation pipe), such as via one or more multiplexers 406. The register fault detector 402 may be connected to the outputs of the various registers to be tested (e.g. the detection pipe), such as via one or more multiplexers 408. Each of the multiplexers 406 and 408 may be connected to the register fault detector 402 and configured to deliver either write data or stored register data to the register fault detector along paths 407 and 409, respectively. It is specifically noted that the configuration depicted herein is depicted for demonstrative purposes only and is not intended to be limiting. For example, the depiction of two multiplexers 406 and 408 is depicted as to multiplexers for convenience purposes; however, each of the multiplexers 406 and 408 may be or include one or more multiplexers, one or more multiplexer cascades, or the like. Additionally or alternatively, multiplexers 406 and 408 may be configured as a single multiplexer. The number of registers to be checked using the multiplexer system disclosed herein is largely unlimited and may be configured for a desired implementation, such as based on available processing resources, computational demands, available capacity of the register fault detector, or any of these. Additionally or alternatively, the number or registers to be checked using the multiplexer system disclosed herein may be based on the criticality of the real registers. In this manner, the register fault detector may adapt its diagnostic approach to the actual system usage.

Should a multiplexing configuration, such as, for example, the multiplexing configuration of FIG. 4, be utilized, the register to be tested at any given clock cycle may be selected based on any of a variety of criteria. For example, the registers to be tested may be selected based on register type, register function, security level, or any of these. Furthermore, the register fault detector (and specifically the compute encoding circuits) may perform any of a plurality of encoding operations to calculate the encoded value. The register fault detector may select an encoding operation of the plurality of encoding operations to be used for a given register or group of registers. This selection may be done from any of a variety of criteria. As nonlimiting examples of such criteria, the register fault detector may select the encoding operation to use based on a register type, a register datatype, a function associated with the stored register data, a grouping or similarity of registers, a grouping or similarity of registered data, or any of these. One additional advantage of the multiplexing configuration described herein is that it permits the fault detector to reuse the encoding resources. That is, data from multiple registers may be calculated by a single circuit or group of circuits (e.g. the compute encoding circuit 212 and/or the compute encoding circuit 216). In this manner, resources are better utilized across the register fault detector, and a more efficient operation is achieved.

In one option, the register fault detector may select registers of the plurality of registers to be tested based on a similarity of encoding operation. That is, a subset of the available registers may be preferably processed for fault detection using a particular encoding operation (e.g. the register fault detector may use the same encoding operation on the subset), and the multiplexers may be configured to select the registers to be tested based on a similarity or sameness of encoding operation used for those registers.

Figure 5:
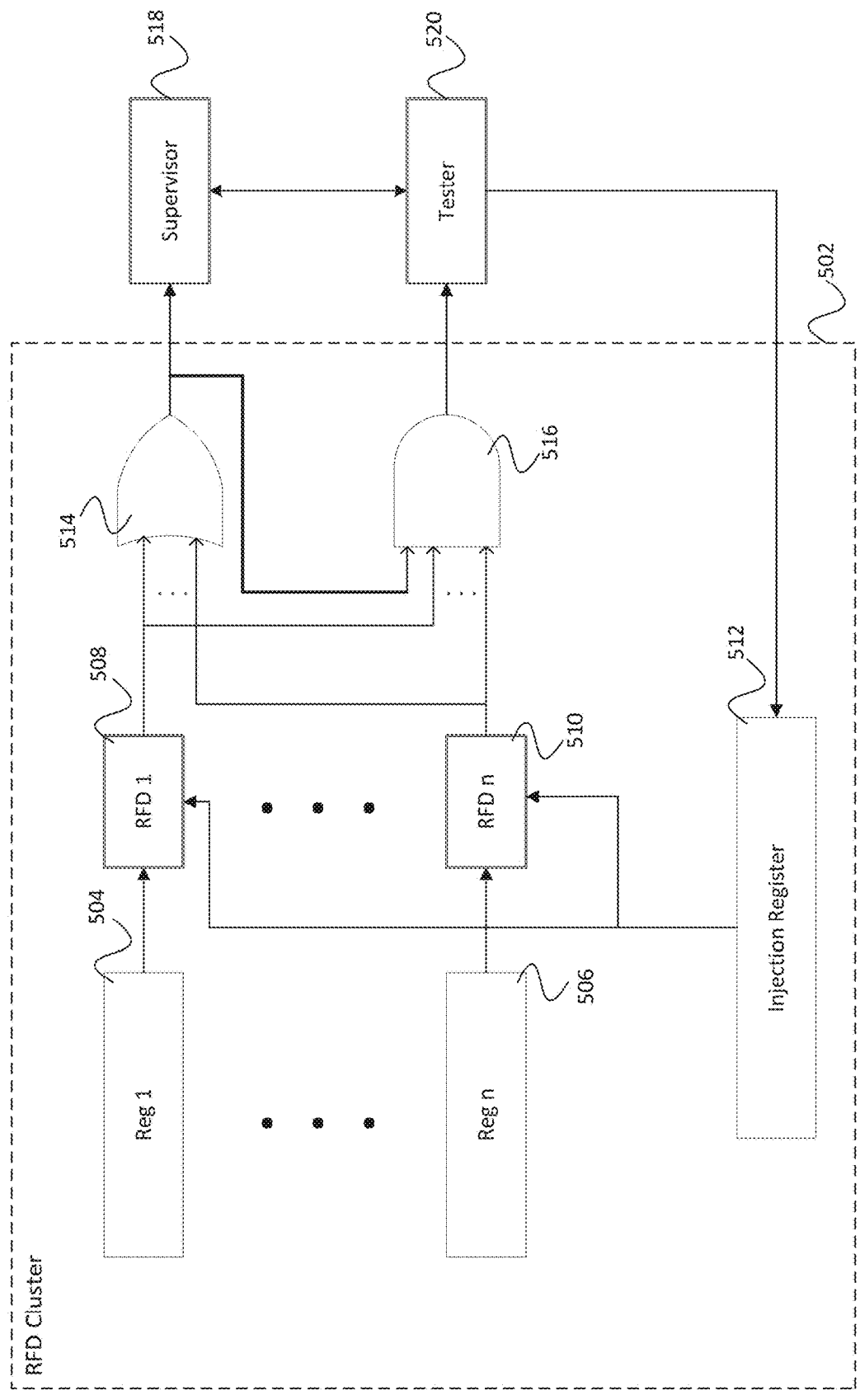
FIG. 5 depicts a self-tester.

FIG. 5 depicts an optional self-tester, which may be used in conjunction with the register fault detector. In this self-tester, a register fault detector cluster 502 includes a plurality of registers to be tested (depicted herein as register one 504 through register n 506), and one or more register fault detectors (depicted herein as register fault detector one 508 through register fault detector n 510). Each register fault detector may output a signal representing an alarm and/or a signal representing entry of the second operational mode. That is, the output signal indicates a determination of whether the first encoded value and second encoded value for the given register fault detector are identical (e.g. non-identical encoding values representing fault detection). In one optional configuration, the number of register fault detectors is equal to the number of registers to be analyzed for fault. In another optional configuration, the number of register fault detectors is fewer than the number of registers to be analyzed for fault, and a time multiplexing analysis of the registers is performed.

Whatever the configuration, it may be desirable to simultaneously or concurrently perform a plurality of register fault detector self-tests (e.g. by injecting an error via the error injector). Whenever self tests are performed, it is advantageous to distinguish between alarm signals resulting from a self test and alarm signals representing an actual detected error. To this end, the following additional structures are disclosed.

The self-tester may include a first logic 514, configured as an OR-logic, and a second logic 516, configured as an AND-logic. The first logic 514 may be configured to receive an alarm signal output of each of the register fault detectors 508-510. The second logic 516 may be configured to receive an alarm signal output of each of the register fault detectors 508-510 and the output of the first logic 514. Furthermore, the self-tester may also include a supervisor circuit 518 (referred to herein as the "supervisor") and a tester circuit 520 (referred to herein as the "tester"). The supervisor 518 may be configured to receive an output of the first logic 514. The tester 520 may be configured to receive an output of the second logic 516. The supervisor 518 and the tester 520 may be configured to send and receive signals between one another. In this manner, it can be determined with a high degree of certainty whether a detected fault is a result of a self-test. The details of this procedure will now be described.

Each of the register fault detectors may be configured to output a signal, which may either have a first logical characteristic (e.g. indicating no detected fault or the first operational mode, assumed for the purposes of consistency as being "low" or a logical zero) or a second logical characteristic (e.g. indicating a detected fault or the second operational mode, assumed for the purposes of consistency as being "high" or a logical one).

Multiple configuration registers protected with register fault detectors can be clustered together. In this manner, the individual register fault detectors can be configured for the above features (algorithm selection, bit-wise masking, error injection enabled) for their respective protected registers. The injection register 512 injects error into the register fault detectors in the cluster (depicted as 504 through 506).

Because the injection register 512 can simultaneously or concurrently inject an error into a plurality of register fault detectors, each of these register fault detectors should correspondingly detect an error. This should result in each of the register fault detectors sending an output signal having the second logical characteristic. These output signals are received by the first logic 514. Because the first logic 514 operates according to an OR-logic, its output will be "high" or a logical one if any receive signal exhibits the second logical characteristic (e.g., an OR-logic). That is, if any register fault detector detects an error, and output of the first logic 514 will be "high" or a logical one. With respect to the second logic 516, the output will be "high" or a logical one if the output of 514 is high or a logical one, and if each of the register fault detectors detect an error (e.g. thus outputting a signal having the second logical characteristic), and the second logic 516 will output a "low" signal or a logical zero if fewer than all register fault detectors detect an error.

Generally speaking, should the supervisor 518 receive an output of the first logic 514 having a "high" signal or a logical one, the supervisor 518 will be aware that a fault has been detected. Under normal circumstances (e.g. outside of the context of a register fault detector self test) this would be an indication that the second operational mode should be entered and additional measures must be taken to ensure appropriate safety levels. The necessary measures to be taken may be largely dependent on the nature of the register on which the fault is detected but may include, and are not limited to, rebooting, taking a register off-line, ceasing performance of one or more operations, or any of these. During a self-test, however, a detected error does not require such measure, and therefore it is necessary to distinguish between errors resulting from register fault and errors resulting from a self-test. This may be achieved by the tester 520. That is, the tester 520 is configured to receive an output signal of the second logic 516. If fewer than all register fault detectors (e.g. all register fault detectors whose output signals are received by the second logic 516) detect fault, and therefore fewer than all register fault detectors output a signal having the second logical characteristic (e.g. a logical one), the output of the second logic 516 will be "low" or a logical zero. Should the supervisor 518 receive an output with a logical one, and the tester 520 receive an output with a logical zero, this is an indication that a legitimate fault has been determined. If however, each of the register fault detectors detects an error (e.g. as a result of a simultaneous or concurrent self-test of a plurality of registers), the output of the second logic 516 will be high. If the supervisor 518 receives a high logical output, and the tester 520 receives a high logical output, this is a strong indication that a self-test has been performed. That is, the supervisor 518 may receive an output of the first logic 514 and an output of the tester 520, and if both of these received outputs are "high" or a logical one, the supervisor will be aware that a self test has been performed, and the supervisor will avoid performance of additional safety measures (e.g. as described above, such as rebooting, taking registers off-line, ceasing performance of operations, etc.). During self-testing, the tester 520 may notify the supervisor 518 to ignore the alarm given out by the register fault detector cluster. The tester 520 can also notify the error injection controller of the register fault detector cluster to expose test outcomes and/or to stop injection. Alternatively, the RFD cluster 502 may perform this operation instead. Of particular note, the self-test procedure described herein does not spoil or corrupt the original register content. Additionally, the self-test mechanism may be executed in a single instance with limited software intervention, thus making it suitable to test several registers with low software complexity and overhead. Finally, the self-test procedure described herein allows for multiple register fault detectors to be tested in parallel, thereby enabling faster on-field testing. That is, when an error is injected, the Error Injection Enable may be propagated to each of the register fault detectors. The output alarms from the register fault detectors are AND-ed together and communicated to the Tester. The output of the OR gate is connected to the AND gate as an input to remedy the possibility or a stuck-at-zero fault in the OR gate. It is expressly noted that the use of the OR-logic as the first logic, and the AND-logic as the second logic is used here as an illustrative example of a possible logical configuration. For example, the fault detectors could be configured to output a two-bit output to indicate a detected fault or no detected fault (e.g. 01 for detected fault and 10 for no detected fault). In this instance, an alternative logic structure would be required, as the single-bit AND-logic and OR-logic as presented herein would not function as intended. The skilled person will understand how to modify the logic in light of the fault detector's output and the example configuration described herein to process a wide variety of fault detector output configurations.

Figure 6:
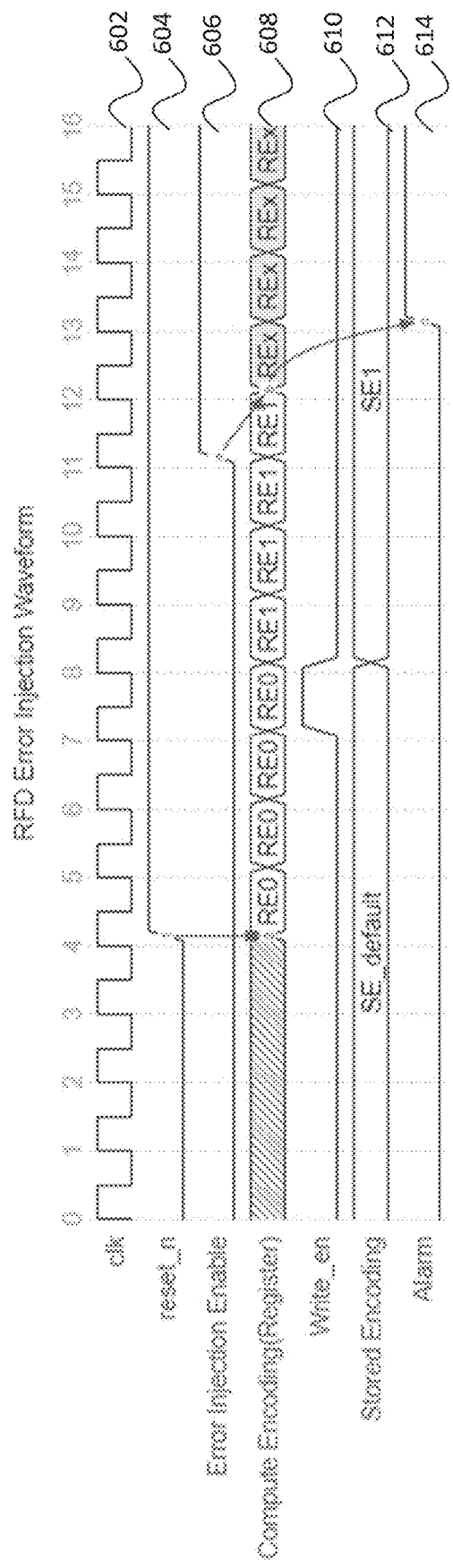
FIG. 6 depicts a timing diagram for the calculation and detection pipes during a register fault detector cluster self-test.

FIG. 6 depicts a timing diagram for the calculation and detection pipes during a register fault detector cluster self-test. The register fault detector may be configured to receive a clock signal 602, a reset signal 604, and an error injection enable signal 606, configured to instruct the error injector to insert an error. Upon completion of a reset 604, the register fault detector may determine an encoded value of first data using a selected encoding operation. The encoded value may be stored in one or more registers on the register fault detector. Additionally or alternatively, the stored value may be a default value. The stored encoding value is depicted in the timeline as 612. Upon completion of the reset 604, the register fault detector may receive at each clock cycle data stored on a register and may determine, for each clock cycle, an encoded value for each set of received register data using the encoding operation. The determination of the encoded values is depicted as 608. The register fault detector compares the stored encoded value 612 with the compute encoding value 608 for each clock cycle. This is depicted with respect to the first stored encoded value in clock cycles 4-6. In this depiction, the stored first encoded value (e.g. based on write data to be stored on a register) and the second encoded value (e.g. from data actually stored on the register) match, and therefore an output signal 614 corresponds to the first operational mode (e.g. no alarm signal is present). At clock cycle 7, a write enable signal is received 610, and the data to be written on the register are received by the register fault detector, and a new first encoded value is calculated and stored (e.g. as depicted by SE1 in line 612). For each subsequent clock cycle, the data stored on the corresponding register are received and a new second encoded value is calculated (e.g. as depicted by RE1 in line 608). For clock cycles 8-11, the first encoded value (SE1) and the second encoded value (RE1) match, and the register fault detector operates according to the first operational mode as seen by 614. In clock cycle 11, the error injection enable signal is brought high 606, triggering injection of an error in the registered encoding 608 (e.g. as depicted by REx). This error causes a mismatch between the first encoded value and the second encoded value, which results in the register fault detector operating according to the second operational mode and outputting an alarm signal 614 (e.g. as depicted in clock cycle 13 and beyond).

Otherwise stated, when an error is injected into the Injection Register, the Error Injection Enable signal is asserted (clock cycle 11). The Compute encoding calculated in that clock cycle (REx) is artificially forced not to match with the Stored Encoding in the Calculation Pipe (SE1). The Compare module raises an Alarm that a Register Fault has occurred. This Alarm output feeds into the AND gate and the output is received by the Tester. Of particular note, the actual contents of the register are untouched and not corrupted by this manner of testing.

Figure 7:
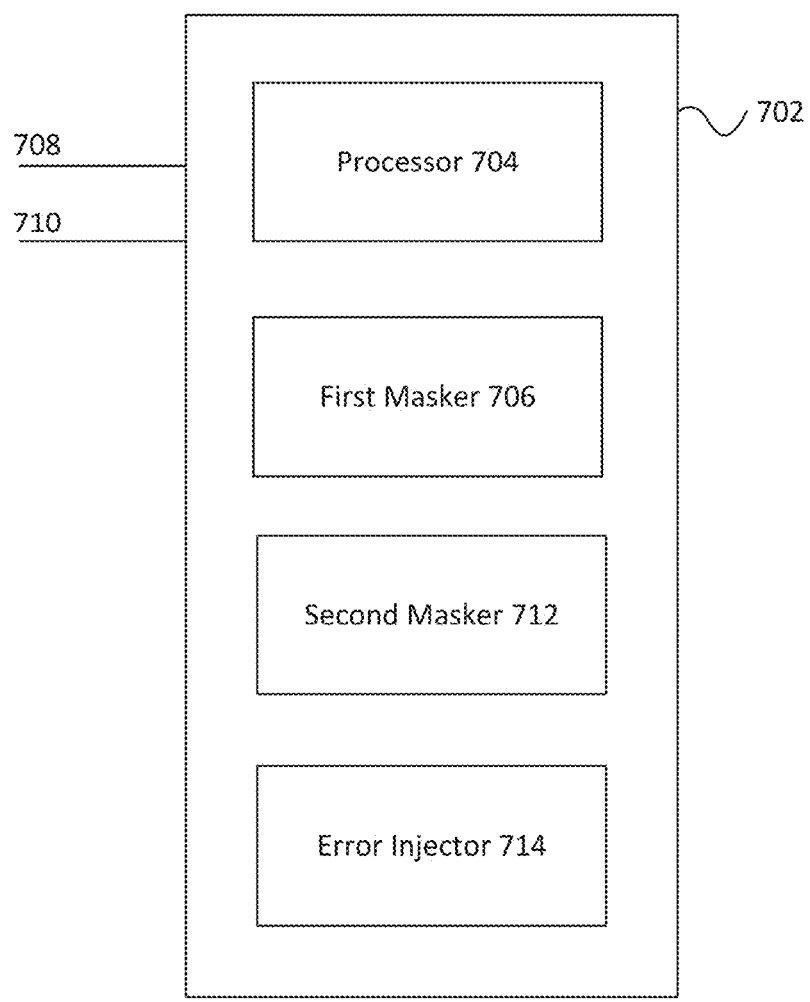
FIG. 7 depicts a fault detector.

FIG. 7 depicts a fault detector 702 that includes a processor 704, which is configured to receive, during a register write event, first data that are to be stored on a first register; determine a first encoded value from the first data using an encoding operation; receive second data from the first register from one or more bit locations on which the first data were to be stored; determine a second encoded value from the second data using the encoding operation; and compare the first encoded value and the second encoded value. If the first encoded value is the same as the second encoded value, the processor 704 is configured to operate according to a first operational mode; and if the first encoded value is different from the second encoded value, the processor 704 is configured to operate according to a second operational mode. The fault detector includes a first electrically conductive connection to a write input of the first register and a second electrically conductive connection to a read output of the first register. The processor is configured to receive the first data over the first electrically conductive connection and to receive the second data over the second electrically conductive connection. The encoding operation may be a parity calculation, a single-bit error correction operation, a double-bit error correction operation, a cyclic redundancy check, the calculation of an error correction code, an error detection code (e.g. double error detection, triple error detection, etc.), or any of these. In addition or in combination with any one of the features mentioned in this paragraph, the encoding operation may be selectable. The processor may select the encoding operation based on a type of register of the first register. In addition or in combination with any one of the features mentioned in this paragraph, the fault detector may further include a second register that is configured to store the first encoded value. In addition or in combination with any one of the features mentioned in this paragraph, comparing the first encoded value and the second encoded value may include comparing the first encoded value stored on the second register with the determined second encoded value. With respect to the operational modes, operating according to the first operational mode may include the processor sending a first signal representing a determination that the first encoded value and the second encoded value are identical or the processor not sending a second signal representing an error (e.g. the absence of an error signal). Operating according to the second operational mode may include the processor sending a second signal representing an error (e.g. for configurations in which an affirmative error signal is necessary to implement the second operational mode), or may include the processor not sending a signal (e.g. for configurations in which the absence of a confirmatory signal or the absence of a signal indicating no alarm is sufficient to enter the second operational mode). In addition or in combination with any one of the features mentioned in this paragraph, the fault detector may include a first data masker 706, which may select fewer than all bits of the first data for determination of the first encoded value; and wherein determining the first encoded value from the first data comprises determining the first encoded value from the fewer than all bits of the first data. In addition or in combination with any one of the features mentioned in this paragraph, the fault detector may include a second data masker 712, which may select fewer than all bits of the second data for determination of the second encoded value; and wherein determining the second encoded value from the second data comprises determining the second encoded value from the fewer than all bits of the second data. In addition or in combination with any one of the features mentioned in this paragraph, the fault detector may include an error injector that is configured to modify the second data, and wherein the processor is configured to perform the encoding operation on the first data and the modified second data, or alternatively the error injector may be configured to modify the second encoded value. The error injector may insert a first error at a first instance and a second error, different from the first error, at a second instance. In addition or in combination with any one of the features mentioned in this paragraph, receiving the second data may include receiving the second data at a first instance; wherein the processor is further configured to receive third data at a second instance, after the first instance, the third data being data from the first register at one or more bit locations on which the first data were to be stored; determine a third encoded value from the third data using the encoding operation; and compare the first encoded value and the third encoded value. In this configuration, if the first encoded value is the same as the third encoded value, the processor will operate according to a first operational mode; and if the first encoded value is different from the third encoded value, the processor will operate according to a second operational mode. In this manner, comparing the first encoded value and the third encoded value includes reading the first encoded value from the second register. The processor may determine the first encoded value using a first encoding operation in the first instance and to determine the third encoded value using a second encoding operation in the second instance. In addition or in combination with any one of the features mentioned in this paragraph, the processor may receive, during a register write event, third data that are to be stored on a second register, determine a third encoded value from the third data using an encoding operation; receive fourth data from the second register at one or more bit locations on which the third data were to be stored; determine a fourth encoded value from the fourth data using the encoding operation; compare the third encoded value and the fourth encoded value; if the third encoded value is the same as the fourth encoded value, operate according to a first operational mode; and if the third encoded value is different from the fourth encoded value, operate according to a second operational mode. In this manner, receiving the second data from the first register comprises receiving the second data at a first instance, and receiving the fourth data from the second register comprises receiving the fourth data at a second instance, following the first instance.

In addition or in combination with any one of the features mentioned in this paragraph, the processor may select the second register from a plurality of registers for receipt of third data based on a priority of the second register. In addition or in combination with any one of the features mentioned in this paragraph, receiving the third data may include receiving the third data to be stored on the second register, based on a priority of the second register.

In addition or in combination with any one of the features mentioned in this or the preceding paragraph, the processor may include a first electrically conductive connection to a write input of the first register and a second electrically conductive connection to a read output of the first register; wherein the processor comprises a third electrically conductive connection to a write input of a third register and a fourth electrically conductive connection to a read output of the third register (e.g. labeled as third to distinguish from the second register on which the encoded value of the first data is stored); and wherein the processor is configured to receive the first data over the first electrically conductive connection; to receive the second data over the second electrically conductive connection; to receive the third data over the third electrically conductive connection; and to receive the fourth data over the fourth electrically conductive connection. In addition or in combination with any one of the features mentioned in this or the preceding paragraph, the processor may include a first electrically conductive connection, selectively connectable to a write input of the first register and to a write input of the third register; a second electrically conductive connection to a read output of the first register; and a third electrically conductive connection to a read output of the third register; and wherein the processor is configured to receive the first data over the first electrically conductive connection; to receive the second data over the second electrically conductive connection; to receive the third data over the first electrically conductive connection; and to receive the fourth data over the third electrically conductive connection. In addition or in combination with any one of the features mentioned in this or the preceding paragraph, the processor may output a signal to selectively connect the first electrically conductive connection to either the write input of the first register or the write input of the second register. In addition or in combination with any one of the features mentioned in this or the preceding paragraph, the first register may be a first type of register and the third register may be a second type of register; the processor may be further configured to select an encoding operation for the first register based on the first type of register and a second encoding operation for the third register based on the second type of register. In addition or in combination with any one of the features mentioned in this or the preceding paragraph, for each processor of each respective fault detector of the plurality of fault detectors, the first operational mode may include the processor sending an error detection signal having a first logical characteristic, and wherein for each processor of each respective fault detector of the plurality of fault detectors, the second operational mode may comprise sending an error detection signal having a second logical characteristic, different from the first logical characteristic; the fault detection system further comprising an error injector, wherein the error injector is configured to modify or cause to be modified the first data or the second data of each fault detector of the plurality of fault detectors.

In addition or in combination with any one of the features mentioned in this or the preceding two paragraphs, the fault detection system may include a first logic, configured to receive the error detection signals of each fault detector of the plurality of fault detectors; such that if all received error detection signals have the first logical characteristic, it outputs a signal having the first logical characteristic; and if any received error detection signal has the second logical characteristic, it outputs a signal having the second logical characteristic (e.g. characterized by an OR-operation); and also include a second logic, configured to receive the error detection signals of each fault detector of the plurality of fault detectors; receive the output signal of the first logic; such that if any of the received error detection signals or the output signal of the first logic have the first logical characteristic, it outputs a signal having the first logical characteristic; and if each of the received error detection signals and the output signal of the second logic have the second logical characteristic, it outputs a signal having the second logical characteristic (e.g. characterized by an AND-operation). In addition or in combination with any one of the features mentioned in this or the preceding two paragraphs, the fault detection system may also include a tester configured to receive the output signal of the first logic unit and the output signal of the second logic unit, and if the output signal of the first logic circuit has the first logical characteristic, operate according to a third operational mode; if the output signal of the first logic circuit has the second logical characteristic, and the output of the second logic circuit has the second logical characteristic, operate according to a fourth operational mode; and if the output signal of the first logic circuit has the second logical characteristic, and the output of the second logic circuit has the first logical characteristic, operate according to a fifth operational mode. In this manner, the fifth operational mode may include sending a signal representing a mismatch alarm, and each of the third and the fourth operational mode may include sending no signal representing a mismatch alarm. The fault detector may further include a masking logic, configured to isolate an output of the error injector from a downstream logic and/or to isolate an output of the error injector from the tester.

A fault detector may include a processor, configured to receive a first plurality of data sets, each data set of the first plurality of data sets being data to be stored on a different register of a first plurality of registers during a write event; determine a first encoded value for each of the first plurality of data sets using an encoding operation; receive a second plurality of data sets, each data set of the second plurality of data sets being data stored on a different register of the first plurality of registers; determine a second encoded value from each of the second plurality of data sets using the encoding operation; and compare each of the first encoded values with a corresponding second encoded value. For each comparison, if the first encoded value is the same as the corresponding second encoded value, the processor may operate according to a first operational mode; and if the first encoded value is different from the corresponding second encoded value, the processor may operate according to a second operational mode. This register fault detector may include one or more second registers, configured to store the first encoded value for each of the first plurality of data sets. In this manner, comparing the first encoded value and the second encoded value may optionally include comparing the first encoded value for each of the first plurality of data sets stored on the second register with the determined second encoded value from each of the second plurality of data sets.

The features of this paragraph may be combined with any one of the features mentioned in the preceding four paragraphs.

Figure 8:
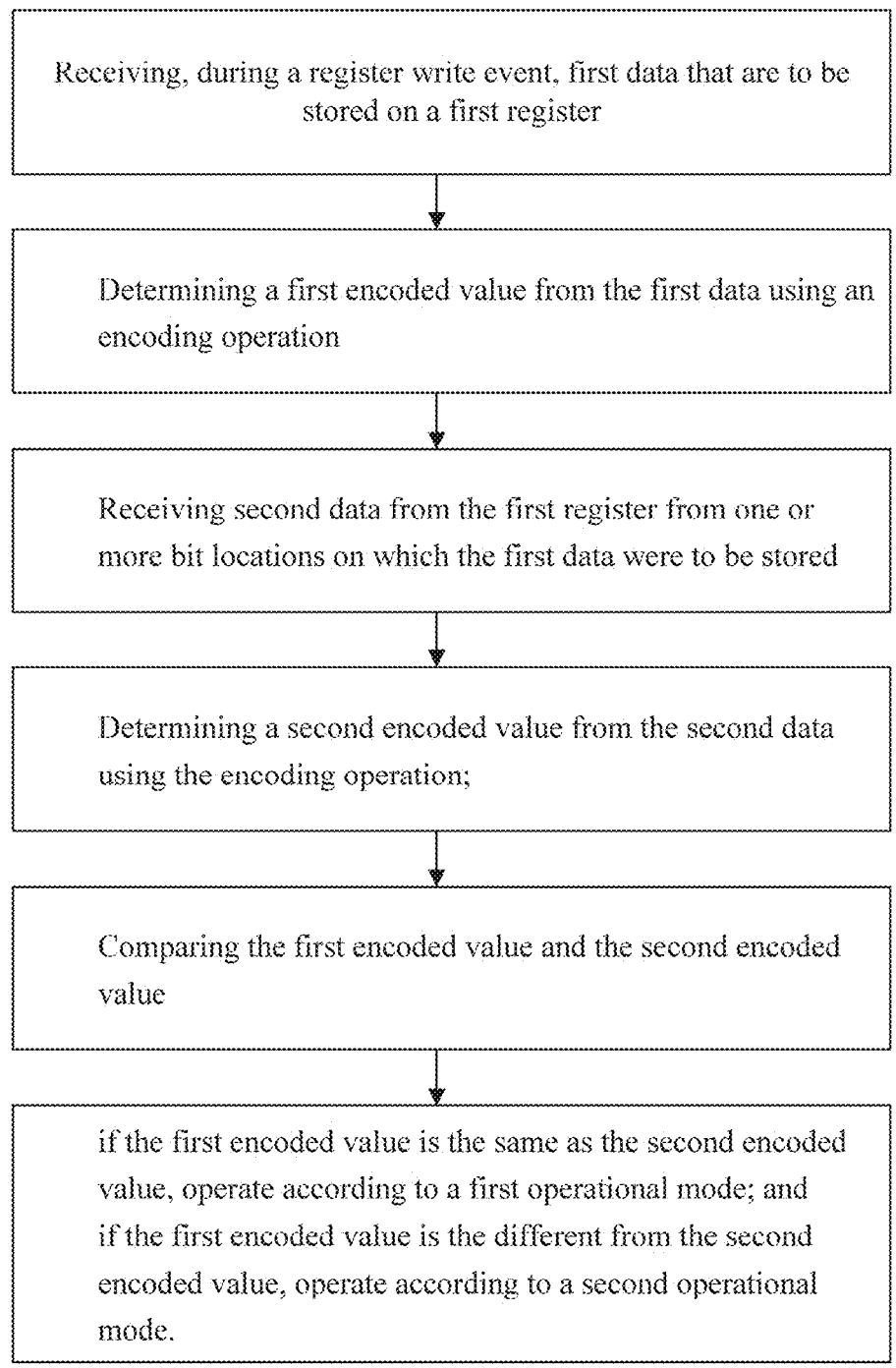
FIG. 8 depicts a method of fault detection.

FIG. 8 depicts a method of fault detection including receiving, during a register write event, first data that are to be stored on a first register 802; determining a first encoded value from the first data using an encoding operation 804; receiving second data from the first register from one or more bit locations on which the first data were to be stored 806; determining a second encoded value from the second data using the encoding operation 808; comparing the first encoded value and the second encoded value 810; if the first encoded value is the same as the second encoded value, operate according to a first operational mode; and if the first encoded value is different from the second encoded value, operate according to a second operational mode. This method may be performed in conjunction with any of the features of the fault detector or the fault detection system described above.

The fault detector may include a plurality of electrically conductive connections from which it receives the first data and the second data. For example, with respect to a single register to be tested for fault, the fault detector may include a first electrically conductive connection to a write input of the register and a second electrically conductive connection to a read output of the register. As stated above, a single fault detector may be configured to perform fault detection on a single register, or on a plurality of registers in a time-multiplexed manner. Whatever the configuration, it is envisaged that the fault detector will include at least one electrically conductive connector to the register to be tested, such that the fault detector can obtain the data stored on the register and the calculate the encoded value for these data using the encoding operation. It is also envisaged that the fault detector will have at least one electrically conductive connection to a write input of the register, such that the fault detector may obtain data to be stored on the register (e.g. such as during a write event) and calculate an encoded value from these data using the encoding operation. As stated above, should a single fault detector be configured to perform fault detection on a plurality of registers, the fault detector may be selectively connected with any of the plurality of fault detectors for a full detection operation. The fault detector may perform this selective connection, for example, using one or more multiplexers, such that the fault detector may perform a time-multiplexing operation, wherein a plurality of registers may be tested for fault by a single fault detector, sequentially.

The encoding operation to calculate the encoded values may include, but is not limited to, a parity calculation, a single-bit error correction operation, a double-bit error correction operation, a cyclic redundancy check, the calculation of an error correction code, an error detection code (e.g. double error detection, triple error detection, etc.), or any of these. The processor may be configured to select a desired encoding operation from a group of possible encoding operations (e.g. such as the preceding list of possible encoding operations). Any of these encoding operations may be tailored to fit a number of bits of input data, a desired number of bits of output data, a desired level of security, etc.

The processor may optionally select the encoding operation for a first cluster of registers based on a similarity of registers (e.g. a similarity of type, a similarity of purpose, a similarity of data handled, etc.). Alternatively or additionally, the processor may select the encoding operation based on a desired level of safety, and availability of processing resources, and availability of error detection resources, or any of these. The processor may be configured to perform one or more routines to select the parity calculation, the single-bit error correction operation, the double-bit error correction operation, the cyclic redundancy check, the calculation of the error correction code, or any of these, as the encoding operation.

The fault detector may include a register (referred to herein as the second register) which may be configured to store the first encoded value. That is, the fault detector may store the first encoded value, which is determined from data to be written on a first register, for future comparisons on the second register of the fault detector. This may be particularly meaningful in a configuration in which the fault detector performs a fault detection on a first register every clock cycle, or at least when the fault detector performs two or more fault detections on the first register between write events. In this manner, the fault detector calculates a second encoded value from data stored on the first register and compares this second encoded value with the first encoded value stored on the second register within the fault detector.

This performance of multiple fault detections following a single write event, or even the performance of fault detections on each of a plurality of clock cycles following a write event, may be referred to herein as performing fault detections in multiple instances. That is, in a first instance, the fault detector calculates a second encoded value from stored register data of the first register, and the fault detector compares this second encoded value with the first encoded value stored on the second register. In a second instance, such as a second instance corresponding to a clock cycle immediately following a clock cycle of the first instance, the fault detector receives data stored on the first register, calculates an encoded value from the data stored on the first register (this may be referred to herein as the third encoded value), and compares this third encoded value to the first encoded value that is stored on the second register.

The consequences of the comparison of the first encoded value in the second encoded value are described herein with respect to operational modes. If the first encoded value in the second encoded value are identical, the fault detector will operate according to a first operational mode. The first operational mode indicates an absence of detected fault for the register and/or a confirmation of proper operation of the register. If the first encoded value and the second encoded value are not identical, the fault detector will operate according to a second operational mode. The second operational mode may be understood as indicating a detected fault within the register.

The actions resulting from the first operational mode or the second operational mode depend upon a desired configuration. In a first possible configuration, the first operational mode, in which no fault is detected, requires neither an alert signal nor a confirmation of appropriate functioning. In this configuration, the underlying system will assume appropriate function of the first register unless or until it receives an alert signal according to the second operational mode. That is, whereas the fault detector may send no particular signal (e.g. no particular alarm signal) during the first operational mode, the fault detector will send an alarm signal during the second operational mode. According to the second possible configuration, the system may require an affirmative indication of proper functioning of a register, or, otherwise stated, the system will assume improper functioning unless an affirmative signal indicating proper functioning is received. In this configuration, the first operational mode will result in the fault detector sending a signal indicating proper functioning of the register. In this configuration, the second operational mode may consist of either the fault detector sending no signal, or the fault detector sending a signal indicating an alarm or improper function of the first register.

According to a third possible configuration, the output of the fault detector may simply be a "high" (e.g. logical one) or "low" (e.g. logical zero). In this configuration, the first operational mode results in the fault detector sending a logical zero in the first operational mode and sending a logical one in the second operational mode. Of note, it would be possible, if desired, to invert this relationship such that the first operational mode results in sending a logical one and the second operational mode results in sending a logical zero; however, this would require reconfiguration of the first logic, the second logic, and the tester. Although the details of this reconfiguration will not be described in detail herein, it is envisaged that the steps to reconfigure these elements are within the knowledge of the skilled person, given the remaining disclosure herein.

The fault detector may include an error injector. The error injector may be configured to receive an error injection signal indicating an intention to perform a self-testing procedure, and based on this error injection signal, inject an error that results in a changed encoded value. More specifically, the error injector may modify the second encoded value and/or the data from which the second encoded value is calculated, such that the second encoded value and first encoded value are no longer identical. In so doing, the comparator will determine a mismatch between the first encoded value and the second encoded value, and the second operational mode will be entered.

A plurality of fault detectors may be configured together within the context of a fault detection system. That is a fault detection system may include a plurality of fault detectors which are configured to perform simultaneous or concurrent fault detection on a plurality of registers (e.g. a plurality of first registers). In this configuration, the fault detection system may include a first logic that is configured to receive the error detection signals of each fault detector of the plurality of fault detectors, such that if all received error detection signals have the first logical characteristic, the first logic will output a signal having the first logical characteristic (e.g. a "low" signal or a logical zero) and if any received error detection signal has the second logical characteristic, output a signal having the second logical characteristic (e.g. a "high" signal or a logical one). The first logic may be configured as an OR-logic. The fault detection system may further include a second logic, configured to receive the error detection signals of each fault detector of the plurality of fault detectors; receive the output signal of the first logic. The second logic may operate such that, if any of the received error detection signals or the output signal of the first logic have the first logical characteristic, the second logic will output a signal having the first logical characteristic; and if each of the received error detection signals and the output signal of the second logic have the second logical characteristic, the second logic will output a signal having the second logical characteristic. The second logic may be configured as an AND-logic.

The fault detection system may include a tester, which may be configured to receive the output signal of the first logic unit and the output signal of the second logic unit, and if the output signal of the first logic circuit has the first logical characteristic, operate according to a third operational mode. The tester may be further configured to operate such that, if the output signal of the first logic circuit has the second logical characteristic, and the output of the second logic circuit has the second logical characteristic, it will operate according to a fourth operational mode; and if the output signal of the first logic circuit has the second logical characteristic, and the output of the second logic circuit has the first logical characteristic, operate according to a fifth operational mode. In this case, the third operational mode may indicate that no error is detected, and the fault detector may take the appropriate steps as described herein when no fault is detected (e.g. send an affirmative message that no fault is detected; send no message; send a logical zero). The fourth operational mode may indicate that no error is detected, and the fault detector may take the appropriate steps as described herein when no fault is detected (e.g. send an affirmative message that no fault is detected; send no message; send a logical zero). The fifth operational mode may indicate that an error is detected, and the fault detector may take the appropriate steps as described herein when a fault is detected (e.g. send an affirmative message that a fault is detected; send no message (when the system assumes fault unless an affirmative no-fault message is send); send a logical one, etc.).

In the context of the fault detection system, such as when a plurality of fault detectors are used, the masking logic may be configured to isolate an output of the error injector from a downstream logic. Alternatively or additionally, the masking logic may be configured to isolate an output of the error injector from the tester. In so doing, the veracity of the self-test is improved, as the determination of a self-test is made from the test results rather than from a mere indication that an error has been injected.

The fault detector may include a processor, configured to receive a first plurality of data sets, each data set of the first plurality of data sets being data to be stored on a different register of a first plurality of registers during a write event; determine a first encoded value for each of the first plurality of data sets using an encoding operation; receive a second plurality of data sets, each data set of the second plurality of data sets being data stored on a different register of the first plurality of registers; determine a second encoded value from each of the second plurality of data sets using the encoding operation; compare each of the first encoded values with a corresponding second encoded value; and for each comparison, if the first encoded value is the same as the corresponding second encoded value, operate according to a first operational mode; and if the first encoded value is different from the corresponding second encoded value, operate according to a second operational mode.

This fault detector may include one or more second registers, configured to store the first encoded value for each of the first plurality of data sets. In this manner, comparing the first encoded value and the second encoded value may include comparing the first encoded value for each of the first plurality of data sets stored on the second register with the determined second encoded value from each of the second plurality of data sets.

Further aspects will be described by way of example:

In Example 1, a fault detector, including: a processor, configured to: receive, during a register write event, first data that are to be stored on a first register; determine a first encoded value from the first data using an encoding operation; receive second data from the first register from one or more bit locations on which the first data were to be stored; determine a second encoded value from the second data using the encoding operation; compare the first encoded value and the second encoded value; if the first encoded value is the same as the second encoded value, operate according to a first operational mode; and if the first encoded value is different from the second encoded value, operate according to a second operational mode.

In Example 2, the fault detector of Example 1, wherein the processor includes a first electrically conductive connection to a write input of the first register and a second electrically conductive connection to a read output of the first register, and wherein the processor is configured to receive the first data over the first electrically conductive connection and to receive the second data over the second electrically conductive connection.

In Example 3, the fault detector of Example 1 or 2, wherein the encoding operation includes a parity calculation, a single-bit error correction operation, a double-bit error correction operation, a cyclic redundancy check, the calculation of an error correction code, an error detection code (e.g. double error detection, triple error detection, etc.), or any of these.

In Example 4, the fault detector of Example 3, wherein the encoding operation is selectable and wherein the processor is further configured to perform one or more routines to select a parity calculation, a single-bit error correction operation, a double-bit error correction operation, a cyclic redundancy check, a calculation of the error correction code, an error detection code (e.g. double error detection, triple error detection, etc.), or any of these, as the encoding operation.

In Example 5, the fault detector of Example 4, wherein the processor is configured to select the encoding operation based on a type of register of the first register.

In Example 6, the fault detector of any one of Examples 1 to 5, further including a second register, configured to store the first encoded value.

In Example 7, the fault detector of Example 6, wherein comparing the first encoded value and the second encoded value includes comparing the first encoded value stored on the second register with the determined second encoded value.

In Example 8, the fault detector of any one of Examples 1 to 7, wherein operating according to the first operational mode includes the processor sending a first signal representing a determination that the first encoded value and the second encoded value are identical.

In Example 9, the fault detector of any one of Examples 1 to 7, wherein operating according to the first operational mode includes the processor sending no signal representing an error.

In Example 10, the fault detector of any one of Examples 1 to 9, wherein operating according to the second operational mode includes the processor sending a second signal representing an error.

In Example 11, the fault detector of any one of Examples 1 to 10, wherein the fault detector further includes a first data masker, configured to select fewer than all bits of the first data for determination of the first encoded value; and wherein determining the first encoded value from the first data includes determining the first encoded value from the fewer than all bits of the first data.

In Example 12, the fault detector of Example 11, wherein the fault detector further includes a second data masker, configured to select fewer than all bits of the second data for determination of the second encoded value; and wherein determining the second encoded value from the second data includes determining the second encoded value from the fewer than all bits of the second data.

In Example 13, the fault detector of any one of Examples 1 to 12, further including an error injector, wherein the error injector is configured to modify the second data, and wherein the processor is configured to perform the encoding operation on the first data and the modified second data.

In Example 14, the fault detector of any one of Examples 1 to 12, further including an error injector, wherein the error injector is configured to modify the second encoded value.

In Example 15, the fault detector of Example 13 or 14, wherein the error injector is configured to insert a first error at a first instance and a second error, different from the first error, at a second instance.

In Example 16, the fault detector of any one of Examples 1 to 15, wherein receiving the second data includes receiving the second data at a first instance; wherein the processor is further configured to: receive third data at a second instance, after the first instance, the third data being data from the first register at one or more bit locations on which the first data were to be stored; determine a third encoded value from the third data using the encoding operation; compare the first encoded value and the third encoded value; if the first encoded value is the same as the third encoded value, operate according to a first operational mode; and if the first encoded value is different from the third encoded value, operate according to a second operational mode.

In Example 17, the fault detector of Example 16, wherein comparing the first encoded value and the third encoded value includes reading the first encoded value from the second register of Example 6 or 7.

In Example 18, the fault detector of Example 17, wherein the processor is configured to determine the first encoded value using a first encoding operation in the first instance and to determine the third encoded value using a second encoding operation in the second instance.

In Example 19, the fault detector of any one of Examples 1 to 18, wherein the processor is further configured to: receive, during a register write event, third data that are to be stored on a third register determine a third encoded value from the third data using an encoding operation; receive fourth data from the third register at one or more bit locations on which the third data were to be stored; determine a fourth encoded value from the fourth data using the encoding operation; compare the third encoded value and the fourth encoded value; if the third encoded value is the same as the fourth encoded value, operate according to a first operational mode; and if the third encoded value is different from the fourth encoded value, operate according to a second operational mode.

In Example 20, the fault detector of Example 19, wherein receiving the second data from the first register includes receiving the second data at a first instance, and wherein receiving the fourth data from the third register includes receiving the fourth data at a second instance, following the first instance.

In Example 21, the fault detector of Example 19 or 20, further including selecting the third register from a plurality of registers for receipt of third data based on a priority of the third register.

In Example 22, the fault detector of Example 19 or 20, wherein receiving the third data includes receiving the third data to be stored on the third register, based on a priority of the third register.

In Example 23, the fault detector of any one of Examples 19 to 23, wherein the processor includes a first electrically conductive connection to a write input of the first register and a second electrically conductive connection to a read output of the first register; wherein the processor includes a third electrically conductive connection to a write input of the third register and a fourth electrically conductive connection to a read output of the third register; and wherein the processor is configured to receive the first data over the first electrically conductive connection; to receive the second data over the second electrically conductive connection; to receive the third data over the third electrically conductive connection; and to receive the fourth data over the fourth electrically conductive connection.

In Example 24, the fault detector of any one of Examples 19 to 22, wherein the processor includes a first electrically conductive connection, selectively connectable to a write input of the first register and to a write input of the second register; a second electrically conductive connection to a read output of the first register; and a third electrically conductive connection to a read output of the second register; and wherein the processor is configured to receive the first data over the first electrically conductive connection; to receive the second data over the second electrically conductive connection; to receive the third data over the first electrically conductive connection; and to receive the fourth data over the third electrically conductive connection.

In Example 25, the fault detector of Example 24, wherein the processor is further configured to output a signal to selectively connect the first electrically conductive connection to either the write input of the first register or the write input of the third register.

In Example 26, the fault detector of any one of Examples 19 to 25, wherein the first register is a first type of register and the third register is a second type of register; wherein the processor is further configured to select an encoding operation for the first register based on the first type of register and a second encoding operation for the third register based on the second type of register.

In Example 27, a fault detection system including a plurality of fault detectors according to any one of Examples 1 to 26, wherein for each processor of each respective fault detector of the plurality of fault detectors, the first operational mode includes the processor sending an error detection signal having a first logical characteristic, and wherein for each processor of each respective fault detector of the plurality of fault detectors, the second operational mode includes sending an error detection signal having a second logical characteristic, different from the first logical characteristic; the fault detection system further including an error injector, wherein the error injector is configured to modify or cause to be modified the first data or the second data of each fault detector of the plurality of fault detectors.

In Example 28, the fault detector system of Example 27, wherein the error injector is the error injector of Example 14 or 15.

In Example 29, the fault detection system of Example 27 or 28, further including: a first logic, configured to receive the error detection signals of each fault detector of the plurality of fault detectors; if all received error detection signals have the first logical characteristic, output a signal having the first logical characteristic; and if any received error detection signal has the second logical characteristic, output a signal having the second logical characteristic; a second logic, configured to: receive the error detection signals of each fault detector of the plurality of fault detectors; receive the output signal of the first logic; if any of the received error detection signals or the output signal of the first logic have the first logical characteristic, output a signal having the first logical characteristic; and if each of the received error detection signals and the output signal of the second logic have the second logical characteristic, output a signal having the second logical characteristic.

In Example 30, the fault detection system of Example 27 or 28, further including: a tester configured to receive the output signal of the first logic unit and the output signal of the second logic unit, and if the output signal of the first logic circuit has the first logical characteristic, operate according to a third operational mode; if the output signal of the first logic circuit has the second logical characteristic, and the output of the second logic circuit has the second logical characteristic, operate according to a fourth operational mode; and if the output signal of the first logic circuit has the second logical characteristic, and the output of the second logic circuit has the first logical characteristic, operate according to a fifth operational mode.

In Example 31, the fault detection system of Example 29, wherein the fifth operational mode includes sending a signal representing a mismatch alarm, and wherein each of the third and the fourth operational mode includes sending no signal representing a mismatch alarm.

In Example 32, the fault detection system of Example 29 or 30, further including a masking logic, configured to isolate an output of the error injector from a downstream logic.

In Example 33, the fault detection system of Example 29 or 30, further including a masking logic, configured to isolate an output of the error injector from the tester.

In Example 34, a fault detector, individually, or in combination with any of the features in Examples 1 to 33, including: a processor, configured to: receive a first plurality of data sets, each data set of the first plurality of data sets being data to be stored on a different register of a first plurality of registers during a write event; determine a first encoded value for each of the first plurality of data sets using an encoding operation; receive a second plurality of data sets, each data set of the second plurality of data sets being data stored on a different register of the first plurality of registers; determine a second encoded value from each of the second plurality of data sets using the encoding operation; compare each of the first encoded values with a corresponding second encoded value; for each comparison, if the first encoded value is the same as the corresponding second encoded value, operate according to a first operational mode; and if the first encoded value is different from the corresponding second encoded value, operate according to a second operational mode.

In Example 35, the fault detector of Example 34, further including a one or more second registers, configured to store the first encoded value for each of the first plurality of data sets.

In Example 36, the fault detector of Example 35, wherein comparing the first encoded value and the second encoded value includes comparing the first encoded value for each of the first plurality of data sets stored on the second register with the determined second encoded value from each of the second plurality of data sets.

In Example 37, a means for fault detection, including: a processing means, configured to receive, during a register write event, first data that are to be stored on a first register; determine a first encoded value from the first data using an encoding operation; receive second data from the first register from one or more bit locations on which the first data were to be stored; determine a second encoded value from the second data using the encoding operation; compare the first encoded value and the second encoded value; if the first encoded value is the same as the second encoded value, operate according to a first operational mode; and if the first encoded value is different from the second encoded value, operate according to a second operational mode.

In example 38, the fault detector of any one of Examples 1 to 26, wherein the encoding operation is selectable and wherein the processor is further configured to perform one or more routines to select the parity calculation, the single-bit error correction operation, the double-bit error correction operation, the cyclic redundancy check, the calculation of the error correction code, an error detection code, or any of these, as the encoding operation.

Throughout this description, a comparison between the first encoded value and the second encoded value is described and, based on the results of this comparison, an operational mode is selected. In some portions of this description, this comparison is described as a determination of whether the first encoded value and the second encoded value "match." Principally there are two options for this evaluation. The first option is that "matching" describes an identity between the first encoded value and the second encoded value. In this configuration, the same procedure (e.g. algorithm, calculations, series of steps, etc.) is used to calculate the first encoded value and the second encoded value, such that, if the first data and the second data are identical, then the first encoded value and the second encoded value will also be identical. The second option is that "matching" describes a sufficient similarity between the first encoded value and the second encoded value based on a relationship between the encoding operations used to calculate the encoded values. In this configuration, a first encoding operation may be used to calculate the first encoded value, and a second encoding operation may be used to calculate the second encoded value. The first encoding operation and the second encoding operation may be selected because of a similarity or complementary nature of their operation. For example, if the first encoding operation calculates a first encoded value of 0011, the second encoding operation may be selected to calculate an inverse value of 1100 from identical data (e.g. the first encoding operation applied to the first data yields 0011, and the second encoding operation applied to the second data yields 1100, wherein the first data and the second data are identical). Other "matching" possibilities are conceivable, such as, for example, the second encoded value being a multiple of the first encoded value, an inverse of the first encoded value, a rotation of the first encoded value, or any of these. Wherever the encoded values are described as "matching" herein, it is expressly stated that this matching may optionally be configured as being an identity, such that the first operational mode is entered when the first encoded value is the same as the second encoded value, and the second operational mode is entered when then first encoded value is different from the second encoded value.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. A fault detector, comprising:
    a processor, configured to:
        receive, during a register write event, first data that are to be stored on a first register;
        determine a first encoded value from the first data using an encoding operation;
        receive second data from the first register from one or more bit locations on which the first data were to be stored;
        determine a second encoded value from the second data using the encoding operation;
        compare the first encoded value and the second encoded value;
        if the first encoded value matches the second encoded value, operate according to a first operational mode; and
        if the first encoded value does not match the second encoded value, operate according to a second operational mode.

2. The fault detector of claim 1, wherein the processor comprises a first electrically conductive connection to a write input of the first register and a second electrically conductive connection to a data output of the first register, and wherein the processor is configured to receive the first data over the first electrically conductive connection and to receive the second data over the second electrically conductive connection.

3. The fault detector of claim 1, wherein the encoding operation comprises a parity calculation, a single-bit error correction operation, a double-bit error correction operation, a cyclic redundancy check, the calculation of an error correction code, an error detection code, or any of these.

4. The fault detector of claim 3, wherein the encoding operation is selectable and wherein the processor is further configured to perform one or more routines to select the parity calculation, the single-bit error correction operation, the double-bit error correction operation, the cyclic redundancy check, the calculation of the error correction code, or any of these, as the encoding operation.

5. The fault detector of claim 3, wherein the processor is configured to select the encoding operation based on a type of register of the first register.

6. The fault detector of claim 1, further comprising a second register, configured to store the first encoded value; wherein comparing the first encoded value and the second encoded value comprises comparing the first encoded value stored on the second register with the determined second encoded value.

7. The fault detector of claim 1, wherein operating according to the first operational mode comprises the processor sending a first signal representing a determination that the first encoded value and the second encoded value match; and wherein operating according to the second operational mode comprises the processor sending a second signal representing a determination that the first encoded value and the second encoded value do not match.

8. The fault detector of claim 1, wherein the fault detector further comprises a first data masking circuit, configured to select fewer than all bits of the first data for determination of the first encoded value; and wherein determining the first encoded value from the first data comprises determining the first encoded value from the fewer than all bits of the first data.

9. The fault detector of claim 8, wherein the fault detector further comprises a second data masking circuit, configured to select fewer than all bits of the second data for determination of the second encoded value; and wherein determining the second encoded value from the second data comprises determining the second encoded value from the fewer than all bits of the second data.

10. The fault detector of claim 1, further comprising an error injector, wherein the error injector is configured to modify one of the first data, the first encoded value, the second data or the second encoded value, and wherein comparing the first encoded value and the second encoded value comprises the processor comparing one of the first encoded value to a second encoded value calculated from the modified second data, comparing the first encoded value to a second encoded value modified by the error injector, comparing the second encoded value to a first encoded value calculated from the modified first data, or comparing the second encoded value to a first encoded value modified by the error injector.

11. The fault detector of claim 1, wherein the fault detector further comprises a stored third encoded value, the third encoded value having been calculated from third data to be stored on a third register using a second encoding operation; further comprising receiving fourth data from one or more bit locations of the third register on which the third data were to be stored; and calculating a fourth encoded value from the fourth data using the second encoding operation; wherein comparing the first encoded value and the second encoded value comprises comparing the first encoded value and the second encoded value at a first instance; further comprising comparing the third encoded value and the fourth encoded value at a second instance, after the first instance.

12. The fault detector of claim 11, further comprising selecting the third register from a plurality of registers based on a priority of the first register and/or a priority of the third register.

13. The fault detector of claim 11, wherein the processor comprises a first electrically conductive connection, selectively connectable to a write input of the first register or to a write input of the third register; a second electrically conductive connection to a read output of the first register; and a third electrically conductive connection to a read output of the third register; and wherein the processor is configured to receive the first data over the first electrically conductive connection; to receive the second data over the second electrically conductive connection; to receive the third data over the first electrically conductive connection; and to receive the fourth data over the third electrically conductive connection.

14. The fault detector of claim 13, wherein the processor is further configured to output a signal to selectively connect the first electrically conductive connection to either the write input of the first register or the write input of the third register.

15. The fault detector of claim 11, wherein the first register is a first type of register and the third register is a second type of register; wherein the processor is further configured to select an encoding operation for the first register based on the first type of register and a second encoding operation for the second register based on the second type of register.

16. A fault detection system comprising a plurality of fault detectors according to claim 1, wherein for each processor of each respective fault detector of the plurality of fault detectors, the first operational mode comprises the processor sending an error detection signal having a first logical characteristic, and wherein for each processor of each respective fault detector of the plurality of fault detectors, the second operational mode comprises sending an error detection signal having a second logical characteristic, different from the first logical characteristic;

the fault detection system further comprising an error injector, wherein the error injector is configured to modify or cause to be modified one of the first data, the first encoded value, the second data or the second encoded value of each fault detector of the plurality of fault detectors.

17. The fault detection system of claim 16, further comprising:
a first logic circuit, configured to:
receive error detection signals of each fault detector of the plurality of fault detectors;
if all received error detection signals have the first logical characteristic, output a signal having the first logical characteristic; and
if any received error detection signal has the second logical characteristic, output a signal having the second logical characteristic; and
a second logic circuit, configured to:
receive the error detection signals of each fault detector of the plurality of fault detectors;
receive the output signal of the first logic circuit;
if any of the received error detection signals or the output signal of the first logic circuit have the first logical characteristic, output a signal having the first logical characteristic; and
if each of the received error detection signals and the output signal of the first logic circuit have the second logical characteristic, output a signal having the second logical characteristic.

18. The fault detection system of claim 17, further comprising:
a tester circuit configured to
receive the output signal of the first logic circuit and the output signal of the second logic unit, and
if the output signal of the first logic circuit has the first logical characteristic, operate according to a third operational mode;
if the output signal of the first logic circuit has the second logical characteristic, and the output of the second logic circuit has the second logical characteristic, operate according to a fourth operational mode; and
if the output signal of the first logic circuit has the second logical characteristic, and the output of the second logic circuit has the first logical characteristic, operate according to a fifth operational mode.

19. The fault detection system of claim 18, wherein the fifth operational mode comprises sending a signal representing a mismatch alarm, and
wherein each of the third and the fourth operational mode comprises sending no signal representing a mismatch alarm.

20. The fault detection system of claim 18, further comprising a masking logic, configured to isolate an output of the error injector from a downstream logic.

21. The fault detection system of claim 18, further comprising a masking logic, configured to isolate an output of the error injector from the tester circuit.

22. A fault detector, comprising:
a processor, configured to:
receive a first plurality of data sets, each data set of the first plurality of data sets being data to be stored on a different register of a first plurality of registers during a write event;
determine a first encoded value for each of the first plurality of data sets using an encoding operation;
receive a second plurality of data sets, each data set of the second plurality of data sets being data stored on a different register of the first plurality of registers;
determine a second encoded value from each of the second plurality of data sets using the encoding operation;

compare each of the first encoded values with a corresponding second encoded value;

for each comparison, if the first encoded value matches the corresponding second encoded value, operate according to a first operational mode; and if the first encoded value does not match the corresponding second encoded value, operate according to a second operational mode.

23. The fault detector of claim 22, further comprising a one or more second registers, configured to store the first encoded value for each of the first plurality of data sets.

24. The fault detector of claim 23, wherein comparing the first encoded value and the second encoded value comprises comparing the first encoded value for each of the first plurality of data sets stored on the second register with the determined second encoded value from each of the second plurality of data sets.

* * * * *